United States Patent [19]

Graham et al.

[11] Patent Number: 5,525,068
[45] Date of Patent: Jun. 11, 1996

[54] ELECTRIC POWER BUSWAY PLUG CONNECTOR SHUTTER ARRANGEMENT

[75] Inventors: Eric J. Graham, Farmington, Conn.; Laura G. Dunn, Virginia Beach, Va.; Richard K. Mann, Titusville, Fla.

[73] Assignee: General Electric Company, Plainville, Conn.

[21] Appl. No.: 411,361

[22] Filed: Mar. 27, 1995

[51] Int. Cl.⁶ ................................................. H01R 25/16
[52] U.S. Cl. ............................................ 439/114; 439/145
[58] Field of Search ........................... 439/113, 114, 439/137, 145; 174/67

[56] References Cited

U.S. PATENT DOCUMENTS

| | | | |
|---|---|---|---|
| 2,725,542 | 11/1955 | Born et al. | 439/114 |
| 3,209,301 | 9/1965 | Duffy, Jr. | 439/114 |
| 3,922,053 | 11/1975 | Hafer | 439/114 |
| 4,146,285 | 3/1979 | Cook . | |
| 4,722,693 | 2/1988 | Rose | 439/145 X |
| 4,772,214 | 9/1988 | Stoegmueller | 439/137 X |
| 4,820,178 | 4/1989 | Anderson et al. . | |
| 4,957,447 | 9/1990 | Hibbert et al. . | |
| 5,011,419 | 4/1991 | Moan | 439/145 |
| 5,020,997 | 6/1991 | Calderara et al. | 439/145 X |
| 5,069,630 | 12/1991 | Tseng et al. | 439/137 |
| 5,336,849 | 8/1994 | Whitney | 439/114 X |

FOREIGN PATENT DOCUMENTS 2270210  8/1992  United Kingdom .

*Primary Examiner*—Gary F. Elkins
*Assistant Examiner*—Christopher J. McDonald
*Attorney, Agent, or Firm*—Richard A. Menelly

[57] ABSTRACT

The electric busway busbars within a plug-in busway system are covered by an insulating cover to prevent inadvertent contact when the busbars are energized. To allow contact with the busbars for busway plug connection, the insulating cover is arranged for automatic exposure of the busway plug access openings by means of a sliding shutter. The shutter automatically returns to the closed position immediately upon removal of the busway plug.

10 Claims, 4 Drawing Sheets

ELECTRIC POWER BUSWAY PLUG CONNECTOR SHUTTER ARRANGEMENT

BACKGROUND OF THE INVENTION

An outlet box for providing electrical connection with busbars within an electric power busway system is described within U.S. Pat. No. 4,820,178 entitled "Outlet Box for Electric Busway System". The box is in the form of an electrically-insulating enclosure having a hinged cover which must be opened to access the busbars.

An electric power busway plug for carrying power from the busbars is described in U.S. Pat. No. 4,957,447 entitled "Electric Power Busway Plug Alignment Arrangement". The busway plug connectors are keyed for insuring that the busbars connect with the corresponding phases within a multi-phase electric distribution system.

Other arrangements for electrically isolating the busbars within an electric power busway system are disclosed in U.K. Patent Application GB 2,270,210 entitled "Busway/Tap-off Box Connection with a Safety Shutter System" and U.S. Pat. No. 4,146,285 entitled "Bus Duct System". In both of these references the safety mechanism is manually retracted to expose the busbars to make connection with the bus plug connectors and is later manually returned to the closed condition to electrically isolate the busbars.

One purpose of this invention is to provide a busbars cover that electrically isolates the busbars when the busway plug is absent while automatically exposing the busbars upon insertion of the busway plug.

SUMMARY OF THE INVENTION

An electric busbar cover in the form of a plastic shutter plate sandwiched between a base support plate and a top apertured access plate is arranged over the busbar access opening in an electric power busway system to electrically isolate the busbars. Insertion of the busway plug within the top apertured access plate automatically displaces the shutter plate to provide electric access to the busbars. Removal of the busway plug automatically returns the shutter plate to the electrically isolating position.

DESCRIPTION OF THE PREFERRED EMBODIMENT

Figure 1:
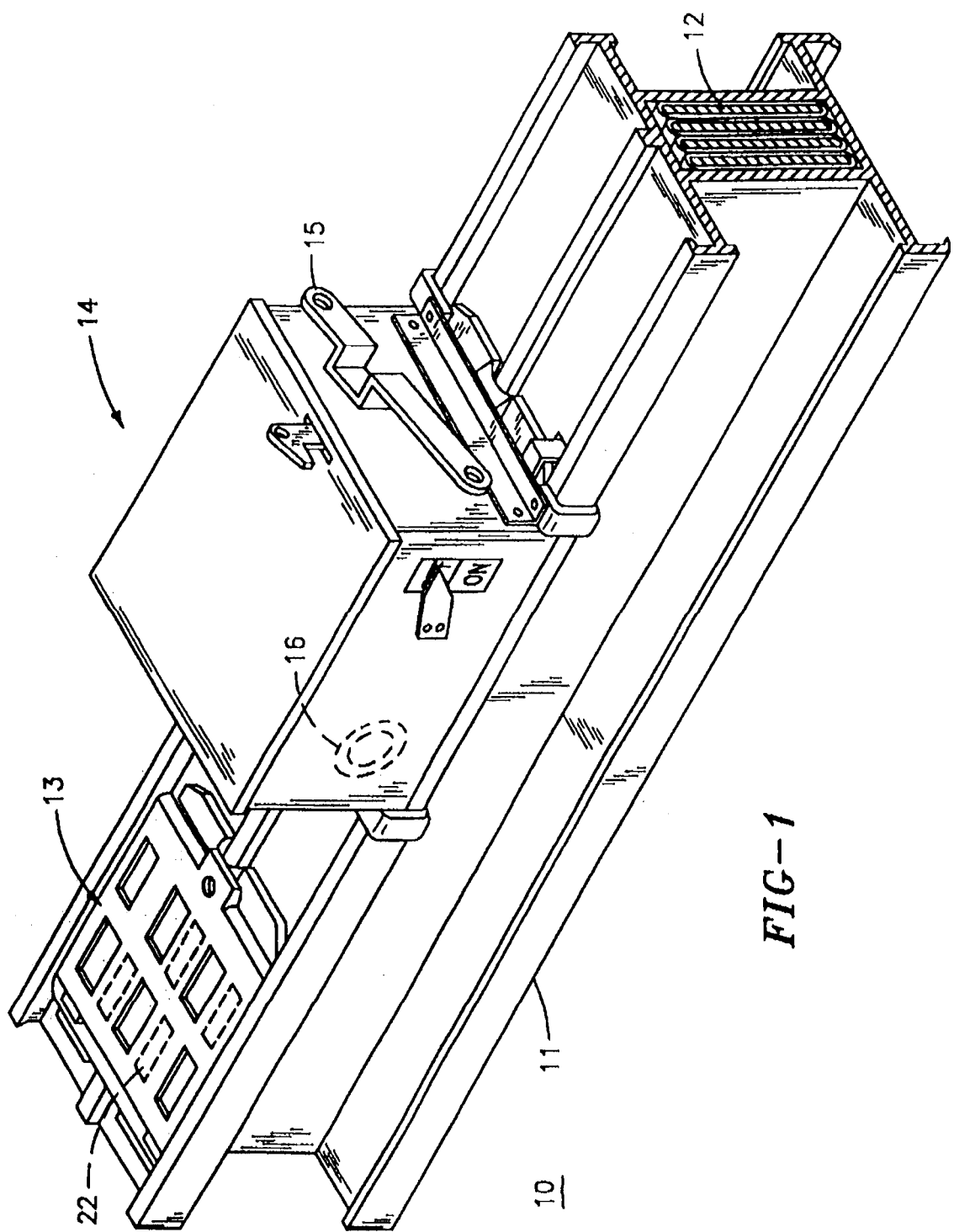
FIG. 1 is a top perspective view of a busway section with a busway plug inserted within a plug cover in accordance with the invention.

An electric power busway section 10 shown in FIG. 1, is similar to that described in the aforementioned U.S. Pat. No. 4,820,178 and includes a plurality of electrically-insulated busbars 12 contained within a support casing 11. External electrical connection with the busbars is made by means of a busway plug 14 to which connection with electrical cables is made by means of the access opening 16 and which is electrically controlled by means of the ON-OFF lever 15. The busbars 12 are electrically-isolated from contact by means of the busbar plug access cover 13, hereinafter "busbar plug outlet".

Figure 2:
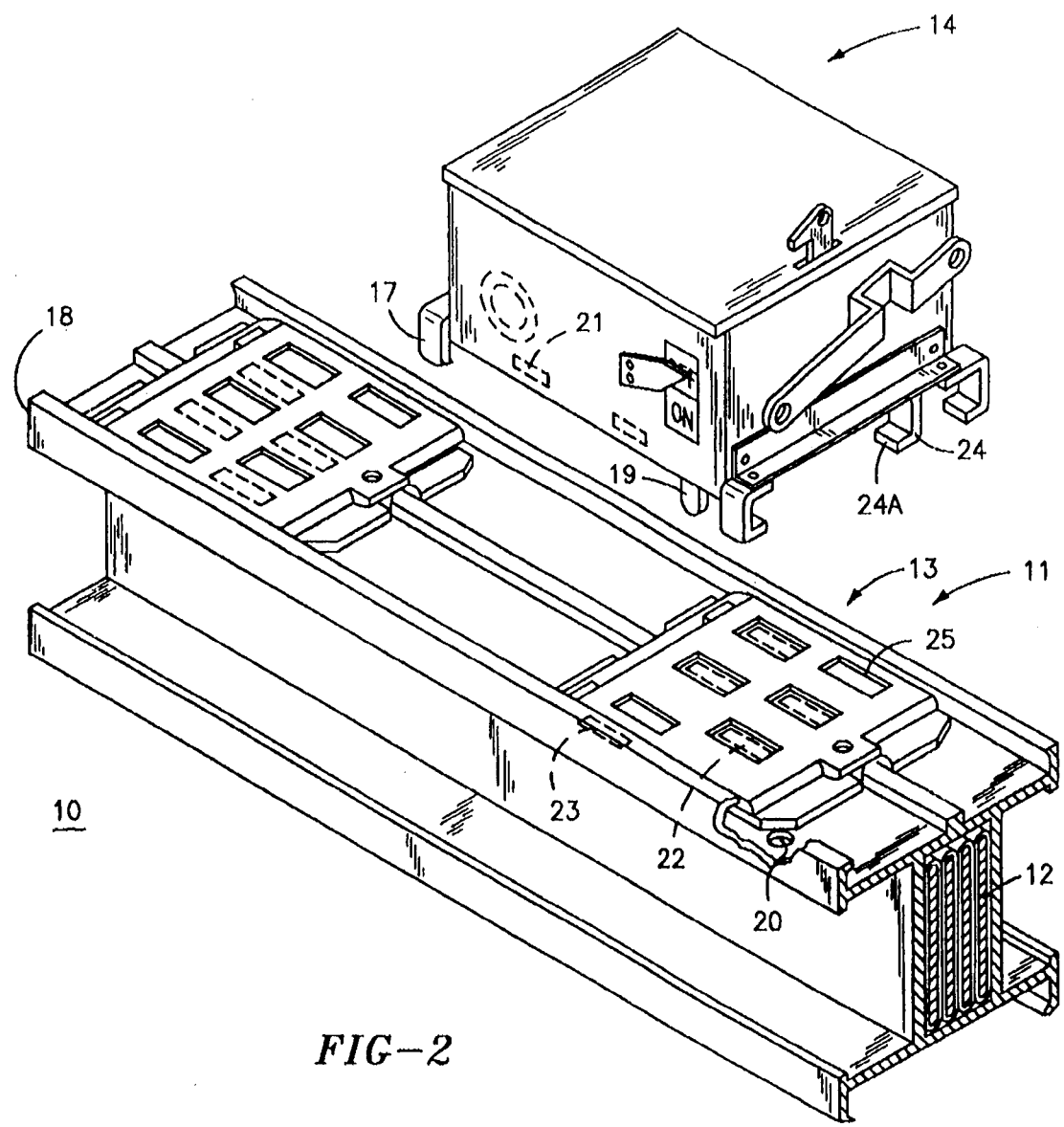
FIG. 2 is a top perspective view of the busway section of FIG. 1 with the busway plug in isometric projection.

To make electrical connection with the busbars 22, the busway plug 14 is inserted directly within the busbar plug outlet 13 without manual intervention, in the manner best seen by now referring to the busway section 10 shown in FIG. 2. The busbars are covered completely by the busbar plug outlet 13 which includes a bus plug slot 25 and a positioning aperture 20, as indicated. The plug connectors 21 and the clamps 17 extending from the bottom of the busway plug unit 14 are correctly positioned with respect to the busbars 12 by means of the actuator pin 19 extending from the bottom of the busway plug unit and the aperture 20, in the top of the busway plug outlet. The automatic exposure of the busbars via the busbar plug outlet 13 is accomplished by the insertion of the actuator pin 19 within the corresponding aperture 20 formed within the busbar plug outlet.

Figure 3:
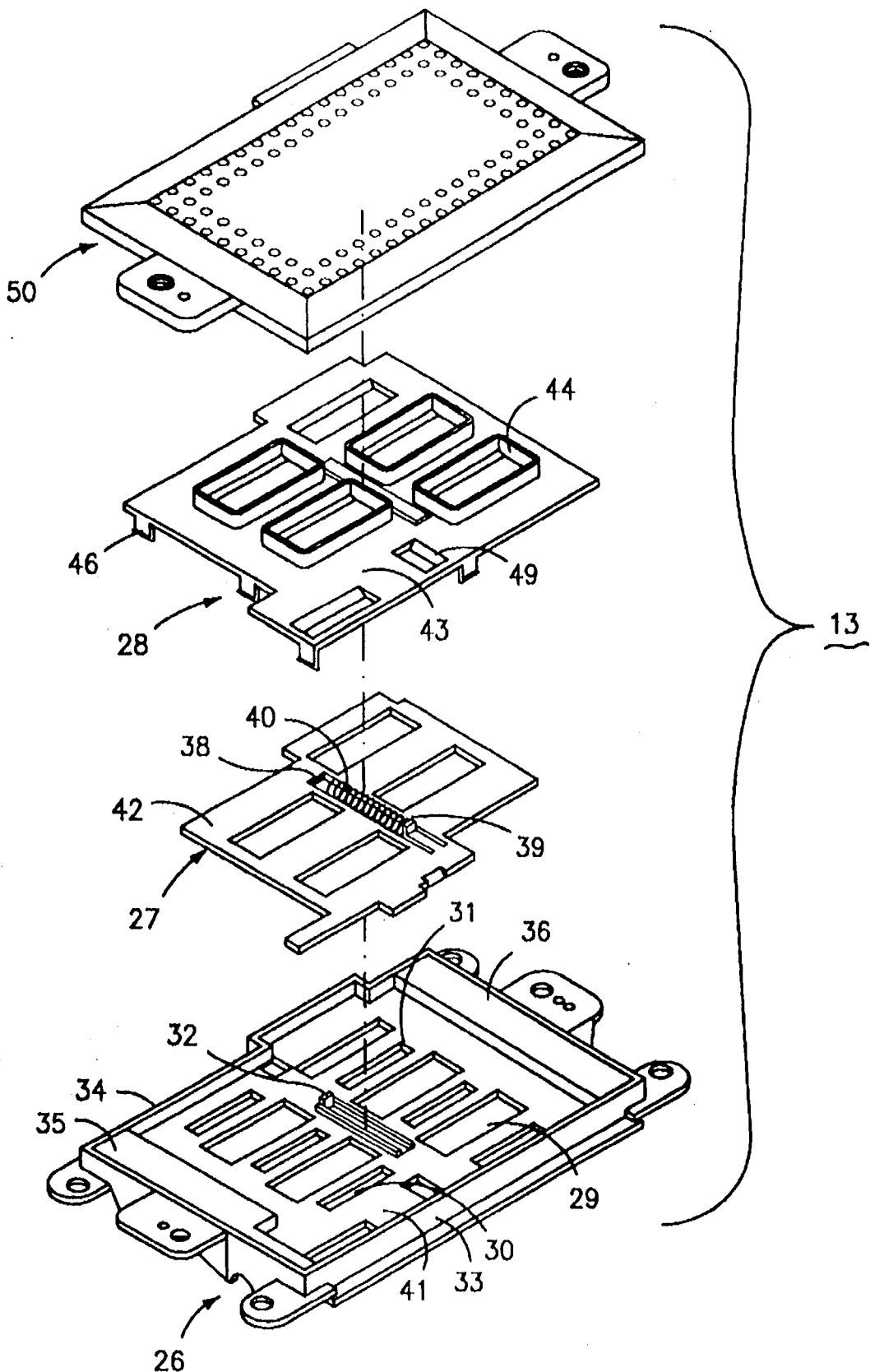
FIG. 3 is a top perspective view of the plug outlet of FIG. 1 with the components in isometric projection.

Before describing the automatic operation of the busbar plug outlet 13 in response to the insertion of the busway plug unit 14, it is helpful to understand the arrangement of the components of the busbar plug outlet 13 as depicted in FIG. 3, prior to assembly. The base unit 26 is in the form of a plastic support plate 41 that includes integrally-formed sidewalls 33, 34 and raised end platforms 35, 36 and further includes a spring-retaining U-shaped formation 32 upstanding from the support plate. Four rectangular shaped apertures 29 are formed in the plate to facilitate entry into the plug shown earlier and a ground stab slot 30 is formed on one side of support plate with the angled guide slot 31 formed in the opposite side thereof. The slide unit 27 in the form of a plastic slide plate 42 is positioned on the base unit 26 such that the access openings 37 on the slide unit are out of registry with the openings 29 and 30 on the base unit in its closed position. The elongated slot 38 formed in the slide unit positions and retains the return spring 40 that is supported on the tang 39. The top unit 28, in the form of a plastic plate 43, is next positioned on the slide unit 27 such that the busbar openings 44, ground bar opening 49 and guide slot 47 on the top unit overlay the corresponding busbar access openings 29, ground bar opening 30 and guide slot opening 31 in the base unit 26 and are completely blocked in the closed position by the interference provided by the intermediate slide unit 27. The top unit 28 is secured to the base unit 26 by press-fitting the tabs 46 extending from the bottom of the base unit into the corresponding slots 45 formed on the opposite edges of the base unit. The drip cover 50 is then positioned over the top unit 28 to provide complete electric isolation.

Figure 4A:
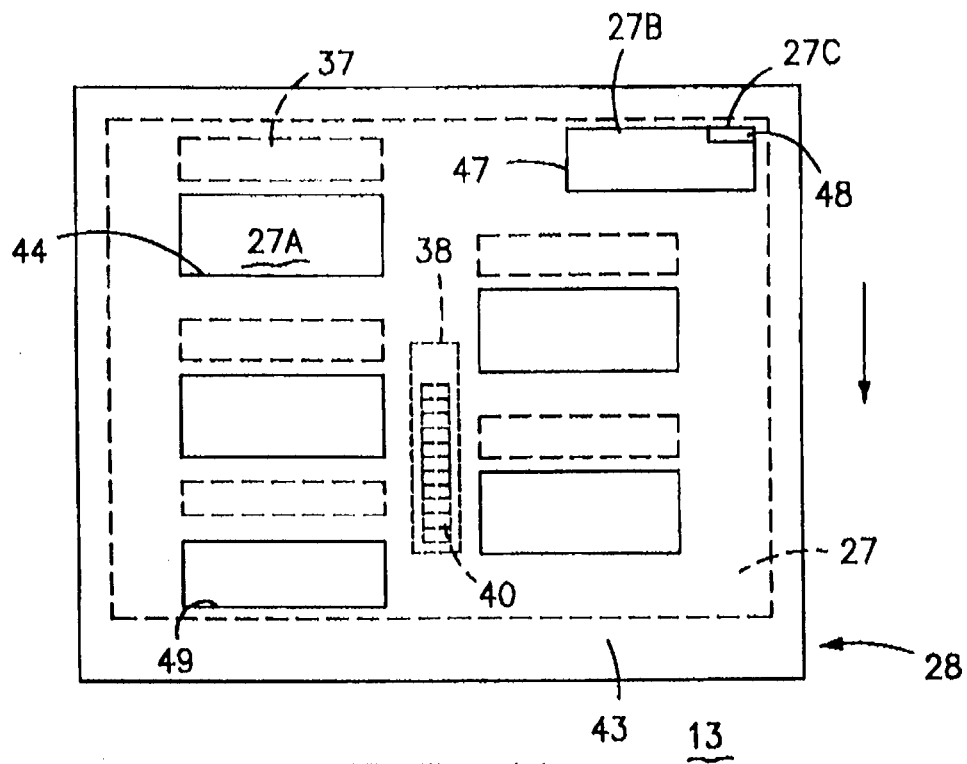
FIG. 4A is a top plan view of the plug outlet of FIG. 1 with the shutter in a blocking position over the bus plug stabs.
Figure 4B:
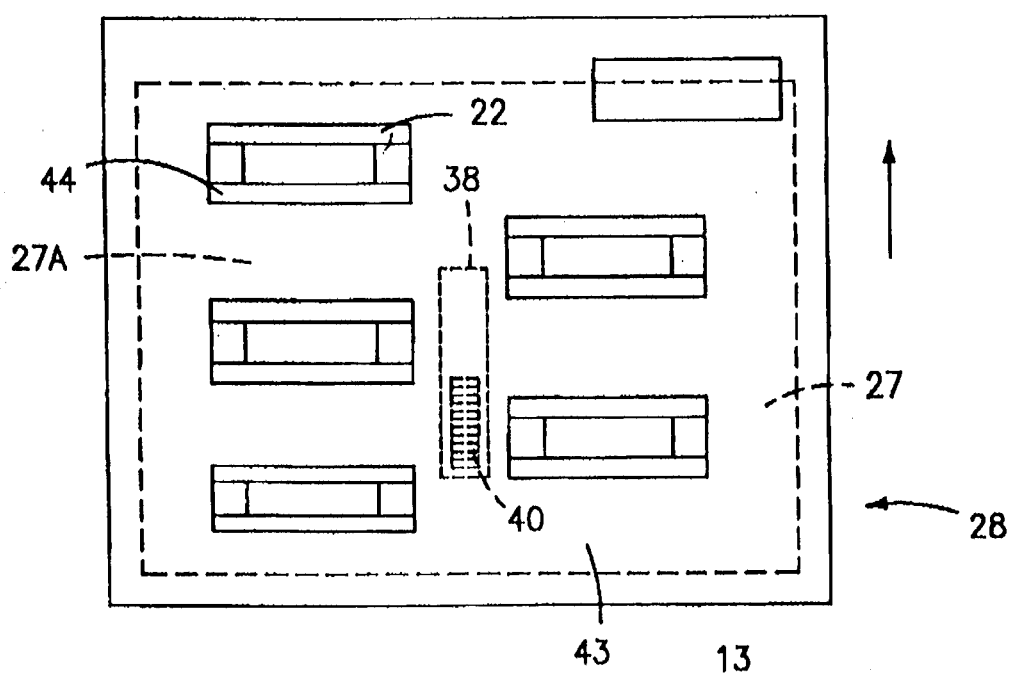
FIG. 4B is a top plan view of the plug outlet of FIG. 4A with the shutter is an exposed position over the bus plug stabs.

Automatic operation of the busbar plug outlet 13 is depicted in FIGS. 4A and 4B that show the closed and open conditions respectively. In the closed condition, the top unit 28 is arranged such that the busbar access openings 44, ground bar access opening 49 and guide slot 47 formed in the cover plate 43 are in registry with the corresponding openings within the base unit, as described earlier. The subjacent slide unit 27, depicted in dotted lines, interfaces between the cover unit and the base unit such that the busbar stab access openings 37 in the slide unit are out of registry with busbar stab access openings 44 in the top unit 28 such that the remaining (unapertured) part of the slide unit blocks the busbar plugs access openings 44, as indicated as 27A. In the closed condition, the return spring 40 is in the relaxed state within the spring slot 38. Although not indicated, the remaining part of the slide unit also blocks the ground stab access opening 49 and the guide slot 47. An opening 48 is defined between the part 27B of the slide unit 27 that underlies the guide slot 47 to allow purchase between the end 24A of the guide stab 24 extending from the bottom of the bus plug unit 14 shown in FIG. 2 and the edge 27C of the slide unit 27 so that the insertion of the guide stab in the guide slot 47 drives the slide unit in the indicated direction to displace the part of the slide unit 27A, as indicated in FIG. 4B and expose the busbars 22 for engagement with busbar plug connectors 21 on the bottom of the bus plug unit 14 shown in FIG. 2. In the open condition, the return spring 40 is compressed against the forward edge of the slot 38 and provides return bias to the slide unit 27 to automatically transfer the guide unit in the direction indicated back to the closed position shown in FIG. 4A, when the bus plug unit is removed and the guide stab 24 on the bottom of the bus plug is out of the guide slot 47.

A busbar plug outlet for a busway electric power distribution system that provides electric isolation from the busbars and allows automatic connection between a bus plug and the busbars has herein been disclosed. The automatic operation during insertion and removal of the bus plug eliminates the need for manual intervention.

We claim:

1. An outlet cover unit for busbar plugs comprising:

an electrically insulating base unit having a plurality of base unit busbar access openings formed therein;

a guide slot formed on one end of said base unit and arranged for receiving a guide plug extending from a bus plug connector unit;

a slide unit on top of said base unit and having a corresponding plurality of slide unit busbar access openings formed therein, said slide unit busbar access openings being out of registry with said base unit busbar access openings when said guide plug is absent from said guide slot; and a top unit on top of said slide unit and having a corresponding plurality of top unit busbar access openings formed therein, said top unit busbar access openings being in registry with said base unit busbar access openings to facilitate connection between busbars and bus plug connectors extending from said bus plug connector unit.

2. The outlet unit of claim 1 including a return spring interacting between said base unit and said slide unit to return said slide unit to a closed position when said guide plug is absent from said guide slot.

3. The outlet unit of claim 1 including retainer slots formed in said base unit and arranged for receiving retainer tabs extending from said top unit for fastening said top unit, slide unit and base unit.

4. The outlet unit of claim 1 wherein said slide unit defines an opening within said outlet unit guide slot whereby and edge of said slide unit is contacted by a part of said plug guide to drive said guide plate to an open position and allow access between said outlet unit busbar access openings and said base unit busbar access openings when said guide plug is inserted within said outlet unit guide plug access opening.

5. The outlet unit of claim 2 wherein said return spring is retained within a spring slot formed on said slide unit.

6. The outlet unit of claim 1 wherein said base unit includes a base unit guide slot in registry with a top unit guide slot.

7. The outlet unit of claim 1 wherein said base unit includes integrally-formed return spring retainer formations arranged for trapping said return spring and compressing said return spring when said guide unit is driven from a closed to an open position.

8. The outlet unit of claim 1 wherein said outlet unit comprises a top unit plastic plate.

9. The outlet unit of claim 1 wherein said slide unit comprises a slide unit plastic plate.

10. The outlet unit of claim 1 wherein said base unit comprises a base unit plastic plate.

* * * * *